(12) United States Patent
Stenton

(10) Patent No.: US 7,079,259 B1
(45) Date of Patent: Jul. 18, 2006

(54) OPTICAL ALIGNMENT FOR A MULTI-MIRROR TELESCOPE

(75) Inventor: William Conrad Stenton, Midland (CA)

(73) Assignee: Raytheon Company, Waltham, MA (US)

( * ) Notice: Subject to any disclaimer, the term of this patent is extended or adjusted under 35 U.S.C. 154(b) by 379 days.

(21) Appl. No.: 10/738,369

(22) Filed: Dec. 15, 2003

(51) Int. Cl.
*G01B 11/02* (2006.01)
*G01B 11/26* (2006.01)

(52) U.S. Cl. ............... 356/508; 356/152.3; 356/152.2

(58) Field of Classification Search ............... 356/508, 356/152.1, 151.2, 151.3, 154
See application file for complete search history.

(56) References Cited

U.S. PATENT DOCUMENTS

| | | | | |
|---|---|---|---|---|
| 4,600,308 A | * | 7/1986 | Waite | ............... 356/508 |
| 4,629,297 A | | 12/1986 | Horine | |
| 5,666,198 A | * | 9/1997 | Stenton | ............... 356/508 |
| 5,684,593 A | * | 11/1997 | Stenton | ............... 356/508 |
| 5,929,992 A | | 7/1999 | Stenton et al. | ............... 356/508 |
| 5,940,181 A | * | 8/1999 | Tsubono et al. | ............... 356/508 |
| 6,327,038 B1 | * | 12/2001 | Maxey | ............... 356/508 |
| 6,402,329 B1 | | 6/2002 | Bailly et al. | |
| 6,570,715 B1 | | 5/2003 | Chen et al. | |

\* cited by examiner

*Primary Examiner*—Gregory J. Toetley
*Assistant Examiner*—Patrick J. Connolly
(74) *Attorney, Agent, or Firm*—William C. Schubert; Karl A. Vick

(57) ABSTRACT

A primary mirror 22 defines an active concave surface 24, a first planar 40 and a first concave 42 alignment surfaces, each facing an active surface 30 defined by a secondary mirror 28. The secondary mirror also defines a second planar 46 a second concave 48 alignment surfaces, each opposite the active surface 30. Alignment beams 64, 66, 68, 70 are reflected from each of the four alignment surfaces, which all face the same direction, to adjust the mirrors. The first planar alignment surface is used to adjust tip and tilt of the primary mirror; the first concave alignment surface is used to position a retro reflector 50 relative to the primary mirror; the second planar alignment surface is used to adjust tip and tilt of the second mirror, and the second concave alignment surface is used to adjust the second mirror in the x, y and z direction relative to the first mirror. The apparatus and method are described for two and three mirror telescopes.

20 Claims, 8 Drawing Sheets

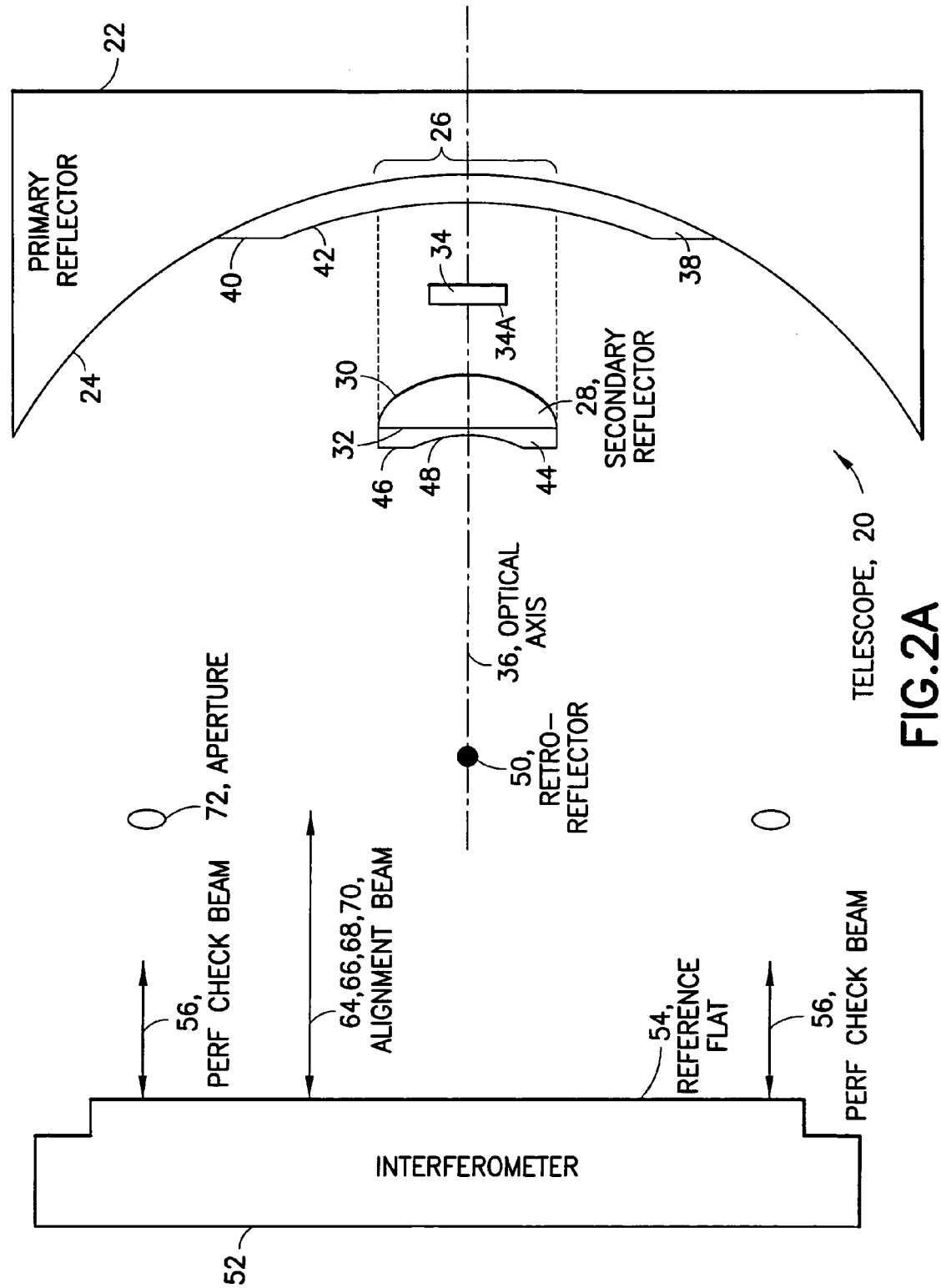

OPTICAL ALIGNMENT FOR A MULTI-MIRROR TELESCOPE

FIELD OF THE INVENTION

The present invention relates to an apparatus and method for optically aligning multiple curved reflectors such as mirrors used for telescopes, and is especially useful for optically aligning two or more such mirrors relative to one another in five or more degrees of freedom.

BACKGROUND

FIG. 1 illustrates a two-mirror telescope 20 as in the prior art with both mirrors in alignment, and is presented as an overview. The telescope 20 comprises a primary reflector 22 that defines an active concave surface 24 that is typically parabolic. Facing the active concave surface 24 is an active surface 30 of a secondary mirror 28 that is typically hyperbolic. Though the active surface 30 of the secondary mirror is depicted as convex, it may alternatively be concave. As used herein, the term active surface refers to an operational surface of the telescope 20. Disposed between the active convex surface 30 and the active concave surface 24 at the focus of the mirror system is a target 34, such as a radiation sensor. Each of the primary reflector 22, the secondary reflector 28, and the target 34 are aligned on an optical axis 36, preferably centered on the axis 36. When aligned, the optical axes 36 of the primary 22 and secondary 28 reflectors are co-incident. The target 34 is preferably centered on the optical axis 36, and may define planar or arcuate active surfaces.

By convention used consistently throughout this disclosure, the optical axis 36 is parallel to a z-axis, and the x-y plane is perpendicular to the optical axis 36. As depicted in FIG. 1 and consistent throughout this disclosure, the x-axis is vertical and parallel to the pages on which the figures are drawn, and the y-axis is perpendicular to the plane defined by the pages on which the figures are drawn. Rotation of a reflector 22, 28 about the y-axis is referred to as tip, and rotation about the x-axis is referred to as tilt. Typically, rotation about the z-axis does not affect telescope alignment as the reflectors 22, 28 are usually symmetric about the z-axis.

When in alignment as shown in FIG. 1, incident light along pathways parallel to the optical axis 36 (the z-axis) strikes the active concave surface 24 of the primary mirror 22 and are reflected toward the active convex surface 30 of the secondary mirror 28, where they are reflected again toward the target 34. Thus, incident light incident on the larger area of the active concave surface 24 is concentrated in a relatively small area of the target 34 (or a portion of the target 34) for better resolution. Assuming both reflectors 22, 28 define the same optical axis 36, the two mirrors define five degrees of freedom: tip and tilt for each of the primary and secondary reflectors 22, 28; and spacing of the reflectors 22, 28 relative to one another in the z-direction. Tipping either of the reflectors 22, 28 causes the reflected incident light to move in the x-direction. Tilting either of the reflectors 22, 28 causes the reflected incident light to move in the y-direction. Moving the reflectors 22, 28 relative to one another along the z-direction causes the focal point of the incident light beams to move in the z-direction.

The two mirrors were typically aligned in the prior art using mechanical means that moved the mirrors in a multi-step process to achieve alignment in all five degrees of freedom sequentially. Typically, each degree of freedom was set manually through trial and error and required much expertise to be done efficiently. Prior art methods were limited in that alignment of only one or two degrees of freedom could be checked at once. The problem with the prior art is that an interferometer allows a user to see the "quality" of the alignment from the system test interferogram in real time, but does not isolate which parameter is to be changed to get the required performance. Therefore, any improper alignment required iteratively checking all degrees of freedom to identify the mis-aligned mirrors. What is needed in the art is an apparatus and method to view all five degrees of freedom, and to isolate one or more mis-aligned axes and reflectors when greater precision and better alignment is desired.

SUMMARY OF THE INVENTION

The present invention provides an apparatus and method by which one or more reflectors, such as of a multi-mirror telescope, may be checked, adjusted and/or aligned with one another optically, and system optical performance may also be checked simultaneously. A typical telescope for which the present invention may be used has a primary reflector that defines an active concave surface, and a secondary reflector that defines an active surface that may be convex or concave. The reflectors are positioned such that the active concave surface of the primary reflector faces the active surface of the secondary reflector. Typically, a target is positioned between these facing active surfaces in a two mirror system, and a tertiary mirror, a target, and other reflectors are positioned opposite the primary reflector in a 3-mirror astigmat system.

In either the two or three mirror system, the improvement includes a planar and a concave alignment surface on at least one of the primary, secondary, or tertiary reflectors. Specifically, if the planar and concave alignment surfaces are defined by the primary or secondary reflector, the planar alignment surface lies perpendicular to an optical axis defined by the active surface of the respective reflector. Similarly, the concave alignment surface of the primary or secondary reflector defines an optical axis that lies coincident with the optical axis defined by the respective active surface. In the case of the tertiary reflector, depending upon the particular astigmat design, the tertiary reflector may lie on or offset from an optical axis defined by the primary and secondary reflectors when properly aligned. In this case then, the planar alignment surface defined by the tertiary reflector lies perpendicular to the optical axis defined by one of the primary or secondary reflectors, and the optical axis defined by the tertiary reflector lies coincident with that defined by that same primary or secondary reflector used in determining perpendicularlity of the planar alignment surface of the tertiary reflector.

In a most preferred embodiment, each of the primary and secondary (and tertiary for a 3-mirror telescope) reflectors define concave alignment surfaces having the same focal point on the optical axis. That is, the focus defined by each of the concave alignment surfaces are coincident, as are the optical axes defined by them. Each of the planar alignment surfaces are perpendicular to that single optical axis, and are therefore parallel to one another. Alignment of additional mirrors may also be enabled by using planar and concave alignment surfaces defined by those additional mirrors. The alignment surfaces are fixed relative to the active surface of the relative reflector or mirror, so more easily enable alignment as compared to using the normal optical path through the telescope.

The method according to the present invention is as follows, though the order of alignment steps may be altered from those disclosed herein without departing from the broader aspects of the claimed invention. First, the primary reflector is adjusted in tip and tilt so that the first planar alignment surface of the primary reflector is perpendicular to an optical axis and to an alignment beam. Preferably, the first planar alignment surface is used to reflect the alignment beam 180° back to be interfered with a reference beam at an interferometer. In this manner, an x-y plane of the first reflector is set to be perpendicular to the optical axis. Next, a retro-reflector such as a ball or a hemisphere or other curved reflective surface is positioned along the optical axis, and its position along the optical axis is adjusted relative to the first reflector. Preferably, the first concave alignment surface is used to reflect an alignment beam, (directed to that surface on a path that is parallel to the optical axis) from the first concave alignment surface, onto the retro-reflector, back to the first concave alignment surface, and back to the interferometer.

The interferometer is used to indicate/measure when the retro-reflector is correctly positioned. When the retro-reflector is a sphere or a hemi-sphere, the center of that sphere will be positioned at the focus defined by the primary concave alignment surface.

Next, the secondary reflector is disposed along the optical axis spaced from the primary reflector and between the primary reflector and the retro-reflector. Tip and tilt of the secondary reflector is then adjusted so that a second planar alignment surface defined by the secondary reflector is perpendicular to the optical axis, preferably using the interferometer as with the first planar alignment surface described above. Next, by observing the interferometer fringe patterns, the secondary reflector is positioned in x, y, and z so that its optical axis is co-incident with the optical axis of the primary reflector, and the first and second reflectors are adjusted relative to one another along that single optical axis. This properly positions the secondary reflector in the x, y and z axes. Properly positioning the secondary reflector along all axes is performed by reflecting a beam from the secondary concave alignment surface of the secondary reflector onto the retro-reflector, and back into the interferometer, similar to that described above with reference to the first concave alignment surface.

The concave alignment surfaces in combination with the retro-reflector and the interferometer allow for precise positioning of the primary and secondary reflectors, limited by the accuracy of the measurement system of the interferometer and by the precision of the primary and secondary alignment surfaces. Preferably, the secondary reflector is adjusted while the primary reflector and retro-reflector remain stationary.

In addition, precision of the alignment, in all five degrees of freedom simultaneously, may be checked using a performance check beam. The performance check beam does not reflect from any of the above-mentioned alignment surfaces. Instead, it is incident (parallel to the optical axis) on the active concave surface of the first reflector, passes to the active convex surface of the second reflector, then to a retro-reflection target reflector surface that may be disposed on the target, back again to the active convex surface of the second reflector, and to the active concave surface of the first reflector. From there, if the two reflectors and target reflector surface are in alignment, the performance check beam passes away from the telescope reflectors parallel to the optical axis, where it is interfered with a reference beam in an interferometer. In this manner, the performance of the telescope system may be determined as well as the reflector alignment in all five degrees of freedom simultaneously.

The above method is directed to a two-mirror telescope system, and all or portions may be extended to aligning some or all of the reflectors of a telescope having more than two reflectors. For example, in an astigmat telescope, the performance check beam will reflect from many surfaces between the two times it reflects from the active surface of the secondary reflector. Due to the location of various reflectors along the optical axis, and space constraints in space-based telescopes, it may not be possible or desireable to impose the alignment surfaces centered on the optical axis but rather offset therefrom, but still having the same optical properties described above. Additionally, the order in which the various reflectors, and their particular degrees of freedom that are adjusted, will vary depending upon the particular embodiment; which type of telescope and where the alignment surfaces are imposed relative to active surfaces and other apparatus. All these are within the present invention even if not explicitly described in every step or embodiment, as they each follow the teachings and principals detailed herein and are intended to be included within the main claims recited herein.

BRIEF DESCRIPTION OF THE DRAWINGS

FIG. 2A is a perspective schematic view of the two-mirror telescope of FIG. 1 showing the preferred embodiment of the present invention, and an interferometer used to aid in optically aligning the two reflectors.

DETAILED DESCRIPTION

Figure 1:
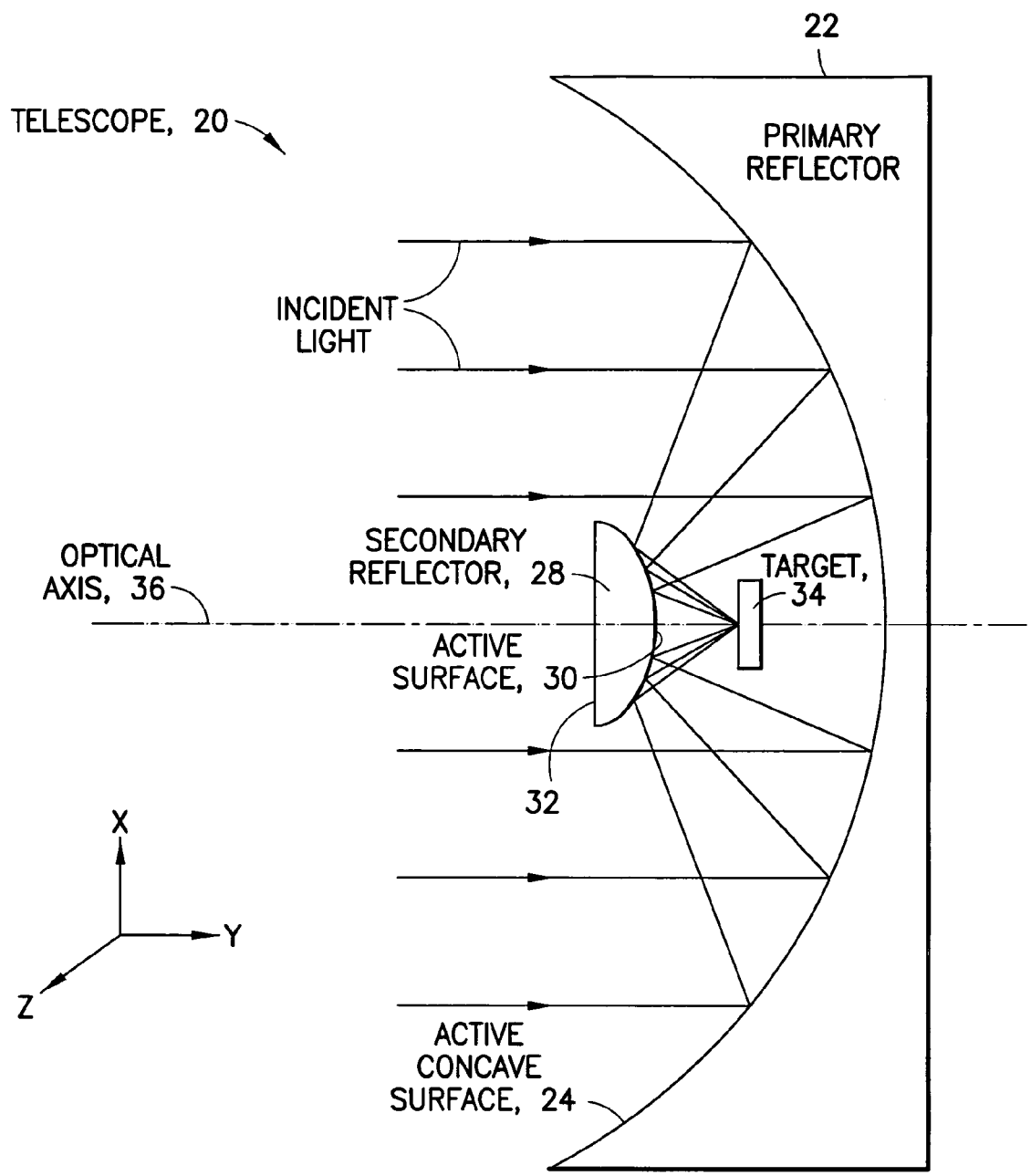
FIG. 1 is a prior art perspective schematic view of a two-mirror telescope properly aligned.

As illustrated in FIG. 2A, a telescope 20 includes a primary reflector 22 that defines an active concave surface 24 facing the direction of incident energy, which may be light, radio waves, or other incident radiation. A portion of the active concave surface 24 is herein referred to as a null zone 26 wherein incident radiation parallel to the optical axis 36 is not collected due to the position of a secondary reflector 28. The secondary reflector 28 defines an active surface 30, that may be convex as depicted or concave, facing the active concave surface 24 of the primary reflector, and an opposing surface 32. A target 34 is disposed between the active surface 30 of the secondary reflector 28 and the active concave surface 24 of the primary reflector 22 upon which the energy received by the primary reflector 22 is maximally concentrated. The primary 22 and secondary 28 reflectors and target 34 are aligned on the optical axis 36. The null zone 26 is that portion of the primary reflector 22 directly shadowed by the secondary reflector 28 by light rays that are parallel to the optical axis 36. In other words, a line that is parallel to the optical axis 36, and circumscribed about the periphery of the secondary reflector 28, traces the periphery of the null zone 26 on the active concave surface 24 of the primary reflector 22.

The present invention exploits the physical arrangement of the primary 22 and secondary 28 reflectors to optically align them with one another, in all axes necessary for optical alignment, and displays that alignment in all axes simultaneously. Specifically, the primary reflector 22 defines an active concave surface 24, a first planar alignment surface 40, and a first concave alignment surface 42, each of which face the active convex surface 30 of the secondary reflector 28. Preferably, these first alignment surfaces 40, 42 are manufactured as part of the primary reflector 22, but may alternatively be defined by a first alignment body 38 that is affixed to the active concave surface 24 of the primary reflector 22. Preferably, the first planar alignment surface 40 defines a circle centered on the optical axis 36, and the first concave alignment surface 42 defines a parabolic surface centered on the optical axis 36, and each surface 40, 42 spans across and extends beyond the null zone 26. The first concave alignment surface 42 defines a parabola having a focus, the focus is spaced beyond the position of the secondary. The planar 40 and concave 42 alignment surfaces do not completely cover the concave surface 24 of the primary reflector 22, and at least a portion of each of the first alignment surfaces 40, 42 lay outside the null zone. Preferably, the first planar alignment surface 40 is disposed outboard, with reference to the optical axis 36, of the first concave alignment surface 42.

The secondary reflector 28 defines an active convex (or concave) surface 30, and both a second planar alignment surface 46 and a second concave alignment surface 48 that are each disposed to face opposite the active convex surface 30. Preferably, these second alignment surfaces 46, 48 are manufactured as part of the secondary reflector 28, but may alternatively be defined by a second alignment body 44 that is affixed opposite to the active convex surface 30 of the secondary reflector 28. In the prior art, the opposing surface 32 (FIG. 1) of the secondary reflector 28 is typically non-functional. The present invention uses it for aligning the secondary reflector 28. Preferably, the second planar alignment surface 46 defines a circle centered on and perpendicular to the optical axis 36, and the second concave alignment surface 48 defines a parabolic surface centered on the optical axis 36. The second alignment surfaces 46, 48 may or may not completely define the opposing surface 32 of the secondary reflector.

Mirror alignment is preferably done optically via an interferometer with sufficient aperture to cover the alignment features. It generates a plane wavefront that defines the optical axis direction and the mirrors are adjusted to this reference for tip and tilt. Use of the various alignment surfaces 40, 42, 46, 48 will now be described. An interferometer 52 as depicted in FIG. 2A may be used to align the reflectors 22, 28. The same interferometer 52 may also be used to evaluate performance of the two-reflector telescope system 20 as shown and described with reference to FIG. 2C. As shown in FIG. 2C, the performance check beam 56 is directed along a path parallel to the optical axis and is incident on one of the active surfaces 24 and 30 then target surface 34A and returning via the active surfaces 30 and 24 to the interferometer where it is interfered with the reference beam at the reference flat. The resulting interference pattern is viewed on the interferometer 52 and analyzed to yield system performance data.

Figure 2B:
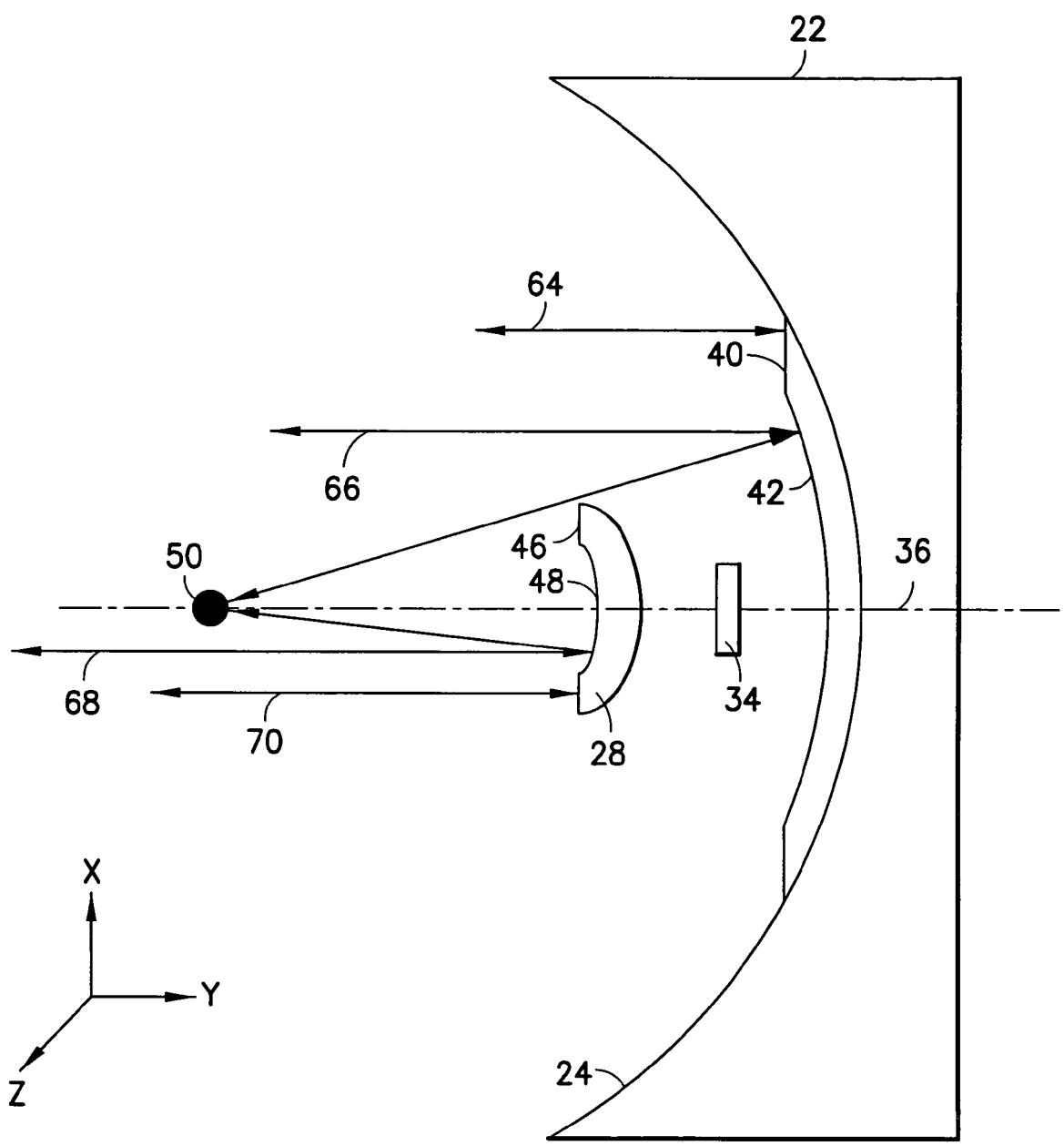
FIG. 2B is a perspective schematic similar to FIG. 2A showing pathways of various light beams reflecting from various alignment surfaces of the reflectors.
Figure 2C:
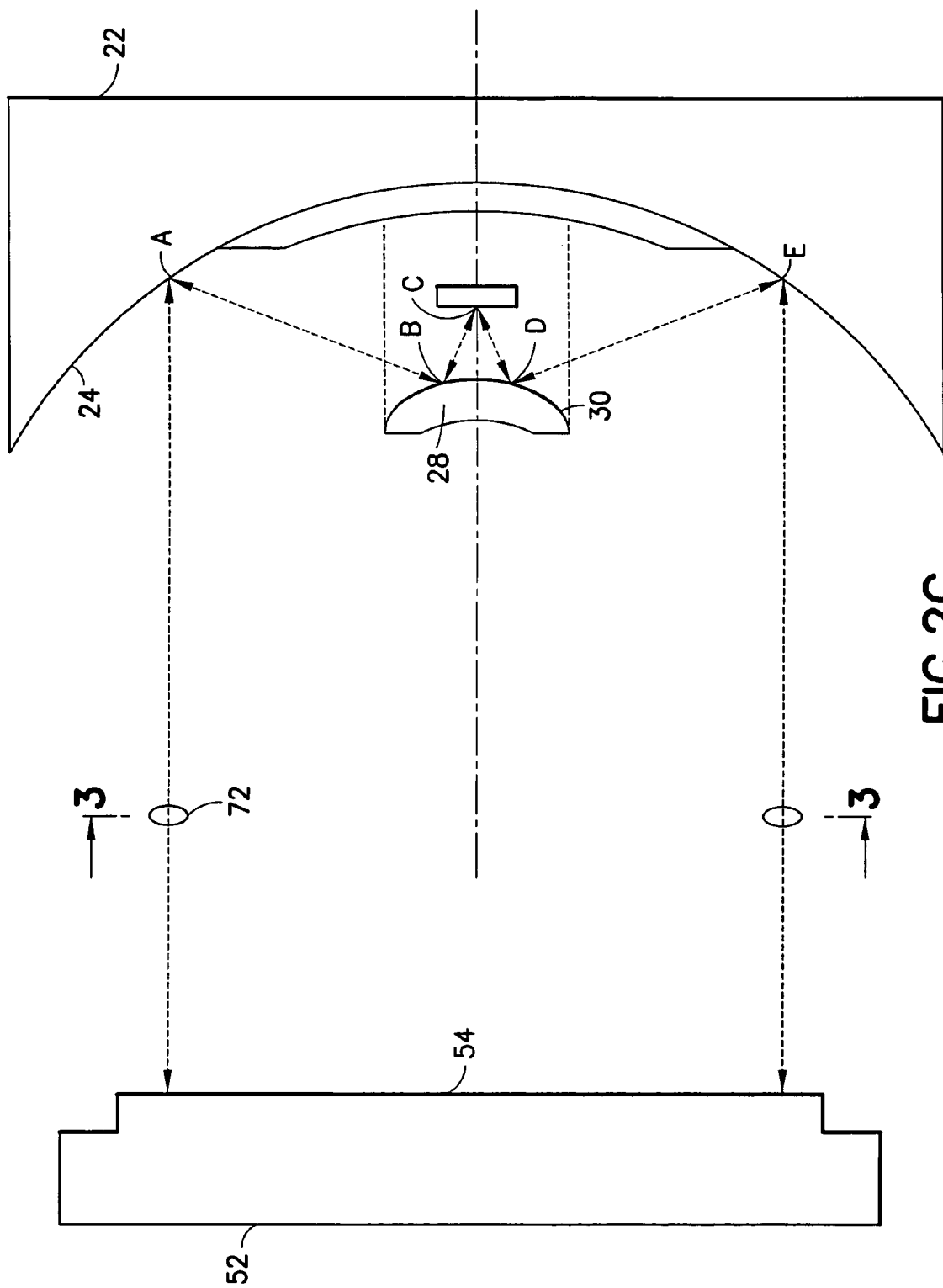
FIG. 2C is a schematic similar to FIG. 2B showing pathway of a performance check beam that shows alignment in five degrees of freedom simultaneously.

The reflective pathways for various alignment beams incident upon the various alignment surfaces is illustrated in FIG. 2B. Each alignment beam is directed at the telescope 20 along a path parallel to the optical axis 36. The primary reflector is aligned in the x-y plane (e.g., for tip and tilt) when a first alignment beam 64 incident upon the first planar alignment surface 40 is reflected exactly 180° back along its path of incidence. Tip and tilt of the primary reflector 22 is adjusted until interference of the first alignment beam 64 with its reference beam at the reference flat 54 is zero or within acceptable limits. This adjusts two degrees of freedom.

As shown in FIG. 2B, a second alignment beam 66, incident upon the first concave alignment surface 42, is reflected from that surface 42 onto a retro-reflector 50. The retro-reflector 50 is preferably a reflective sphere or a hemisphere. However, the retro-reflector 50 may be any arcuate surface body used to reflect light back to the first 42 and second 48 concave alignment surfaces. Where the operative surface of the retro-reflector is spherical, the sphere defines a center that lies at the focus defined by the first concave alignment surface 42. When the primary reflector 22 is aligned along the optical axis 36, the focus also lies along the optical axis 36, by definition. The retro-reflector 50 is adjusted relative to the primary reflector 22 such that the second alignment beam 66 reflects from the first concave alignment surface 42 to the retro-reflector 50, and back again along the exact optical path from which it originated. The position of the retro-reflector 50 relative to the primary reflector 22 is adjusted until interference at the reference flat 54 is zero or within acceptable limits. The second alignment beam 66 positions the retro-reflector 50 relative to the primary reflector 22, and so does not constitute adjusting a degree of freedom since the retro-reflector 50 does not form a part of the telescope 20. The retro-reflector 50 now defines the optical axis 36 as it is positioned on the optical axis 36 of the alignment and active surfaces of the primary mirror. This is important as to this point we have only aligned the primary so its optical axis points in the correct direction as defined by the interferometer 52. Positioning the ball 50 now fixes a point in space that defines the optical axis.

From the above, it is clear that the alignment surfaces must be precisely oriented with respect to the active surfaces. As such, precision of the eventual alignment is dependent upon the planar alignment surfaces 40, 46 being perpendicular to the optical axis 36 defined by the active concave surface 24, and on the optical axes defined by the concave alignment surfaces 42, 48 being coincident with the optical axes defined by the active surfaces 24, 30 of the primary 22 and secondary 28 reflectors. It is therefore preferable that the alignment features (the alignment surfaces) be made with the primary and secondary reflectors, rather than being removably attached to separately manufactured components.

The secondary reflector 28 is aligned such that a third alignment beam 70 incident upon the second planar alignment surface 46 is reflected exactly 180° back along its path of incidence. This aligns the secondary reflector 28 in the x and y axes (e.g., tip and tilt) as previously detailed, and ensures that the secondary reflector 28 is perpendicular to the optical axis 36. However, at this juncture the secondary reflector may be out of its proper position relative to the primary mirror in either of the x, y or z directions.

FIG. 2B also shows a fourth alignment beam 68 incident upon the second concave alignment surface 48. The fourth alignment beam 68 is reflected from that surface 48 onto the retro-reflector 50. Since the retro-reflector 50 is already spaced properly relative to the primary reflector 22 along the optical axis 36, preferably only the secondary reflector 28 is moved into alignment at this point. Alternatively, the combination retro-reflector 50 and primary reflector 22 can be moved in unison relative to the secondary reflector 28, but their relative position to one another should be maintained. The secondary reflector 28 is adjusted such that the fourth alignment beam 68 that reflects from the second concave alignment surface 48 onto the retro-reflector 50, returns along the exact optical path from which it originated, via reflection again from the second concave alignment surface 48. This positions the vertex of the secondary reflector 28 on the optical axis 36, which aligns the secondary reflector 28 in the x and y direction so that the optical axis defined by the secondary reflector 28 lies co-incident with the optical axis 36 defined by the primary reflector 22. These represent the third and fourth degree of freedom. Aligning the fourth alignment beam 68 as above also positions the secondary reflector 28 in the proper position along the optical axis 36 (the z axis) relative to the primary reflector 22. The position of the secondary reflector 28 relative to the primary reflector 22 along the optical axis 36, as well as in the x and y direction, is adjusted until interference at the reference flat 54 is zero or within acceptable limits. Adjustment of the reflectors 22, 28 relative to one another along the z axis represents the fifth degree of freedom. Once aligned, the performance check beam 56 is used to gage performance of the telescope 20 at the reference flat 54, as detailed below.

Figure 3:
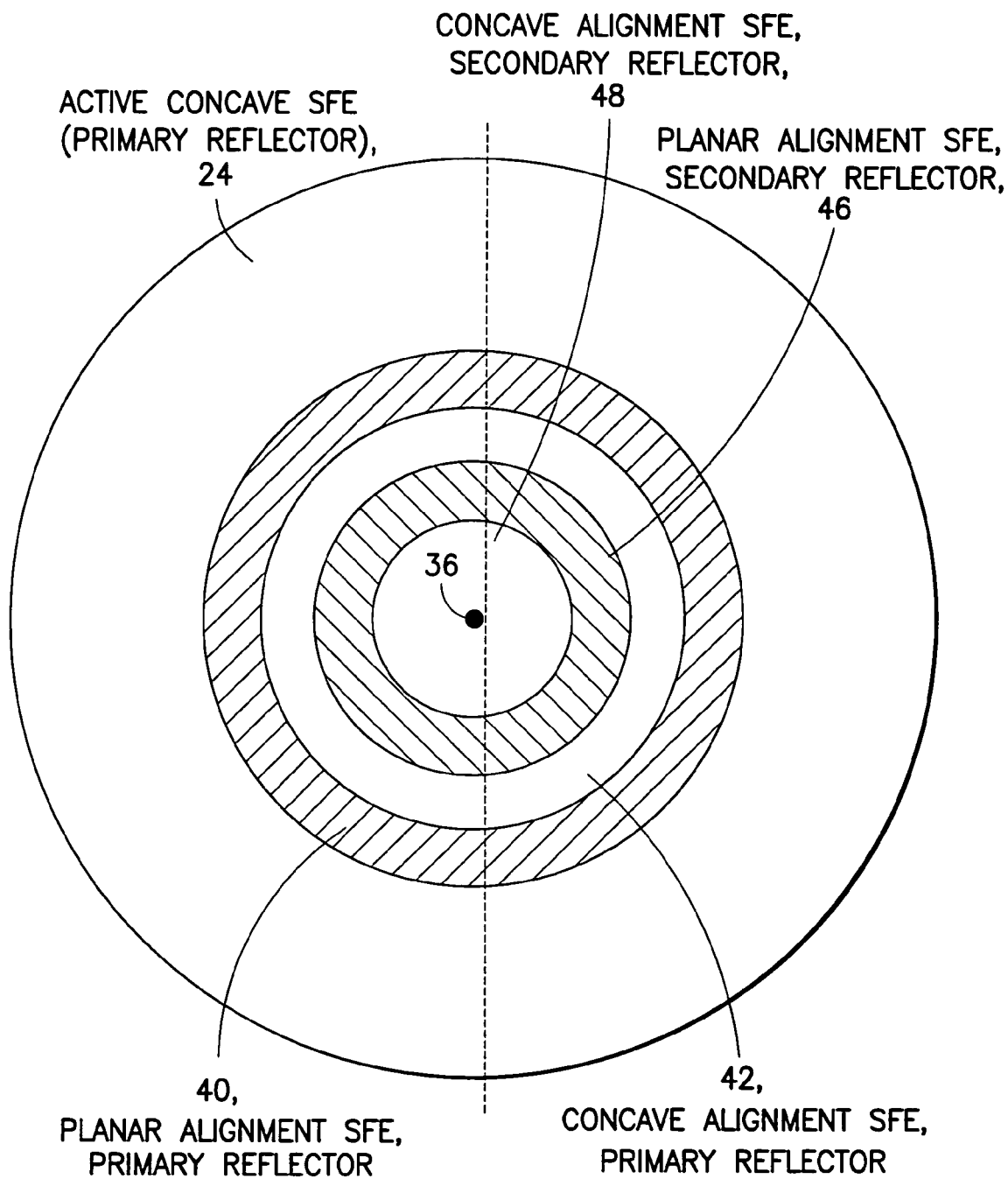
FIG. 3 is a view along section line 3—3 of FIG. 2C showing the various alignment surfaces according to the preferred embodiment of the present invention.

FIG. 2C describes checking alignment of the system in all five degrees of freedom simultaneously. Preferably, a performance check beam 56 is generated by a laser (not shown) and is directed toward the concave surface 24 of the primary reflector 22 along a path of incidence that is parallel to the optical axis 36. The performance check beam 56 incident on the primary reflector 22 follows the optical path shown in FIG. 2C, from active concave surface 24 to active convex surface 30 to a retro-reflection target surface 34A that may be imposed across the target 34. The target 34 may or may not normally define such a reflective surface. Upon striking the planar reflecting surface 34A, the performance check beam 56 is reflected back toward the active convex surface 30 back to 24 and into the interferometer where its double pass travel is analyzed. Specifically, and referring to FIG. 2C, the performance check beam 56 strikes the active concave surface 22 at point A, then the active convex surface 30 at point B, and the retro-reflection target surface 34A at point C. From there, the performance check beam 56 returns to the active convex surface 30, but strikes at point D, reflects from the active concave surface 24 at point E, and exits via another aperture 72. The performance check beam 56 returns to the interferometer 52, and is interfered with the original beam, and viewed on the interferometers screen. Thus, performance of the system may be optically checked as well as the alignment achieved in each degree of freedom simultaneously A view along section line 3—3 of FIG. 2C, showing arrangement of the planar 40, 46 and concave 42, 48 alignment surfaces, is illustrated in FIG. 3. The optical axis 36 lies in the center of the diagram, and all surfaces as viewed along the optical axis 36 are concentric. Immediately outboard of the optical axis 36 lies the second concave alignment surface 48 of the secondary reflector 28, which is encompassed by the second planar alignment surface 46 of the secondary reflector 28. Continuing outward from the center 36 lay the first concave alignment surface 42 of the primary reflector 22, followed by the first planar alignment surface 40 of the primary reflector 22. In this preferred embodiment, each of the alignment surfaces 40, 42, 46, 48 define a circumference with the optical axis 36 at the center. Alternatively, any or all of the alignment surfaces 40, 42, 46, 48 may define only a portion of the circular surfaces depicted in FIG. 3.

Figure 4:
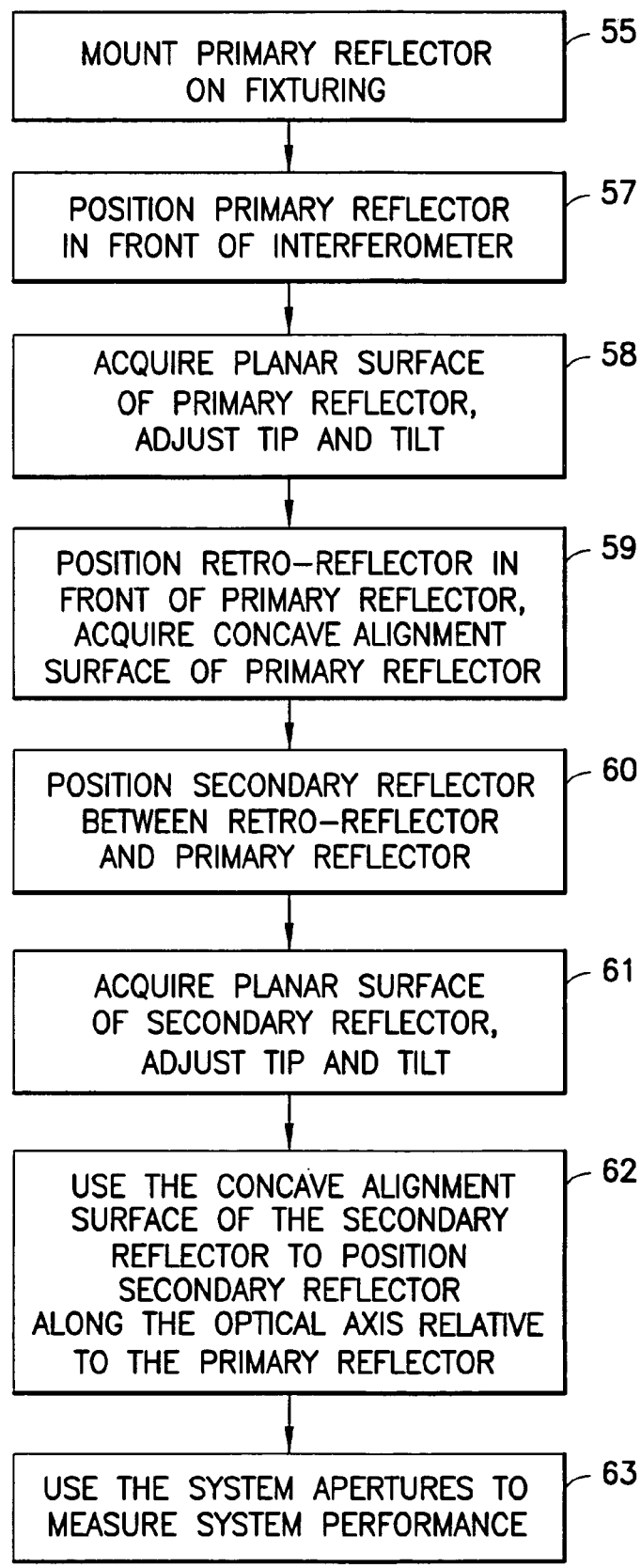
FIG. 4 is a flow diagram showing steps of the preferred method for aligning reflectors of a two-reflector telescope, and for measuring precision of that alignment.

FIG. 4 is a block diagram illustrating the steps of a method of aligning the primary 22 and secondary 28 reflectors. First, the primary 22 and secondary 28 reflectors are mounted on fixturing at block 55, which carries their weight and includes means to adjust position of the mirrors in the x, y and z directions. At block 57, the primary reflector 22 is positioned in front of the interferometer 52, or vice versa. Next at block 58, the first planar alignment surface 40 is acquired using the first alignment beam 64, and the fixturing is used to adjust tip and tilt of the primary reflector 22. The retro-reflector 50 is positioned in front of the primary reflector 22 at block 59, and is positioned properly relative to the primary reflector 22 by acquiring the first concave alignment surface 42 with the second alignment beam 66.

The second reflector 28 is positioned between the retro-reflector 50 and the primary reflector 22 at block 60. At block 61, the second planar alignment surface 46 is acquired using the third alignment beam 70, and tip and tilt of the secondary reflector 28 is adjusted to minimize interference at the reference flat. Alignment is completed at block 62 by acquiring the second concave alignment surface 48 and adjusting the position of the secondary reflector 28 both relative to and along the optical axis 36. Alignment precision across all five degrees of freedom, and by extension performance of the telescope system 20, is measured at block 63 by passing a performance check beam 56 through an aperture 72, re-acquiring it through another aperture 72, and measuring interference at the reference flat 54.

By the above apparatus and method, a single interferometer 52 may be used to obtain all alignment information as well as measure alignment precision using the performance check beam 56. While a single interferometer has been shown and described for all four alignment beams and the performance check beam, multiple interferometers may be used, or other optical alignment apparatus known in the art. Where surfaces are referred to as facing surfaces, they may be offset from one another while still remaining facing one another. For example, FIG. 2A depicts a first planar alignment surface 40 offset in the x direction from an active convex surface 30, yet the first planar alignment surface 40 and the active convex surface 30 face one another.

The above description is believed the simplest implementation of the present invention. Alternatively, any or all of the alignment surfaces (40 and 42, 46 and 48) may be disposed opposite their associated active surfaces (24 and 30, respectively), and the alignment beams would be incident from the opposite direction (from right to left as in FIGS. 2A–2C) as compared to incident radiation (from left to right as in FIGS. 2A–2C). In such an arrangement, the retro-reflector 50 would be located between the origin of the alignment beams and the alignment surfaces 46, 48 of the secondary reflector 28.

The principle of the invention as described above may be extended to more than two mirrors. Though some of the concave alignment surfaces depicted in FIGS. 5A–B may appear to define an optical axis that is offset from that defined by the active concave surface 24, that is so that the drawings will clearly show curvature and is not to represent that an optical axis of a concave alignment surface is not coincident with the depicted optical axis 36. A concave alignment surface that is not centered on that optical axis 36 represents only a portion of a curve or imaginary surface that defines an optical axis. When the reflectors are properly aligned, such a defined optical axis is coincident with the aforementioned and illustrated optical axis 36. In certain telescopes (not shown), a concave alignment surface may be offset from the optical axis 36 and embody only a non-central portion of an underlying curve or imaginary surface. In such instances, the optical axis is defined mathematically by the underlying curve or imaginary surface of which the physically embodied concave alignment surface forms a part.

Figure 5A:
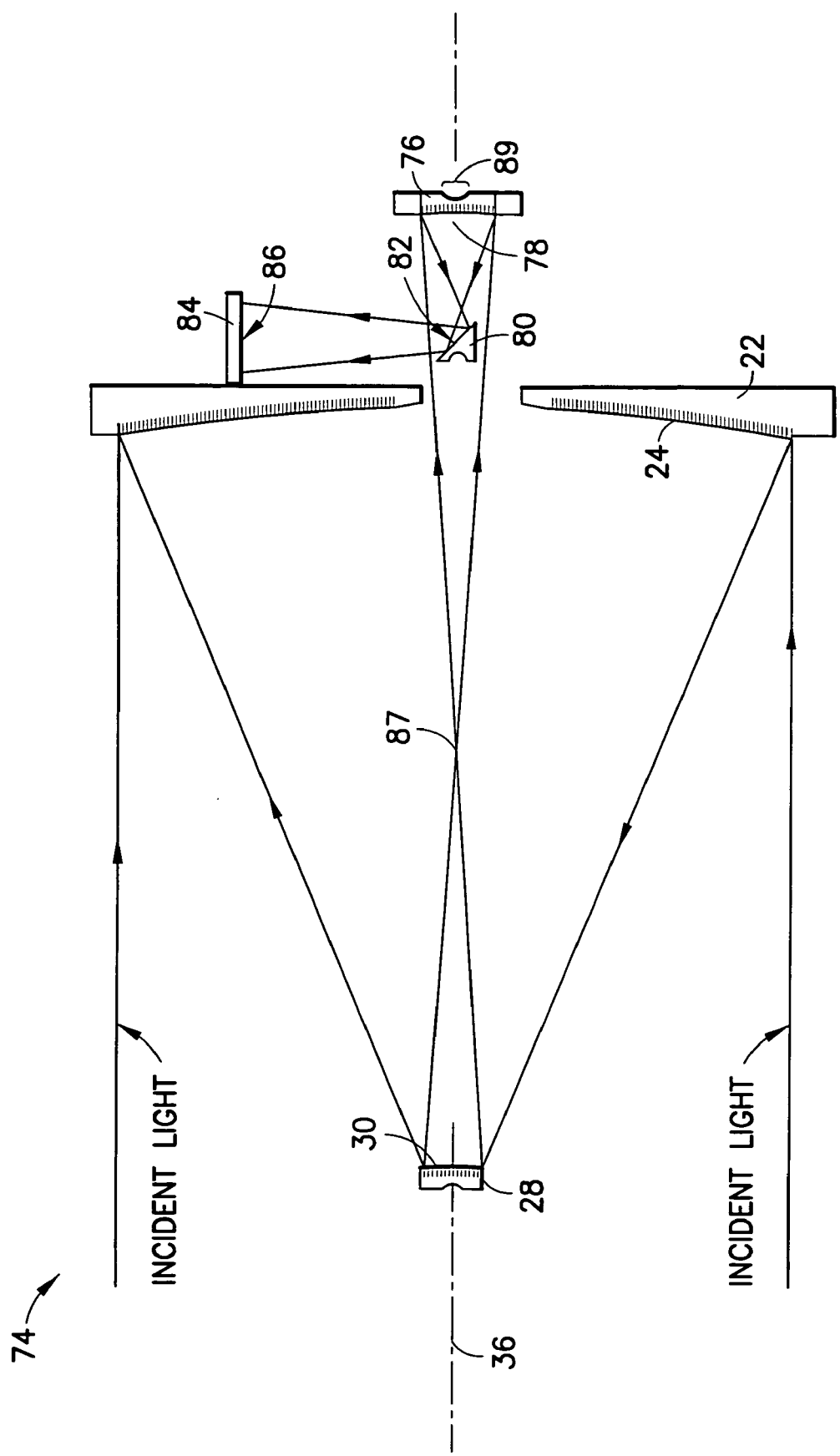
FIG. 5A is a perspective schematic view of a three-mirror off-axis astigmat telescope employing the alignment surfaces of the present invention in one embodiment, showing optical paths during normal (non-alignment) operation.
Figure 5B:
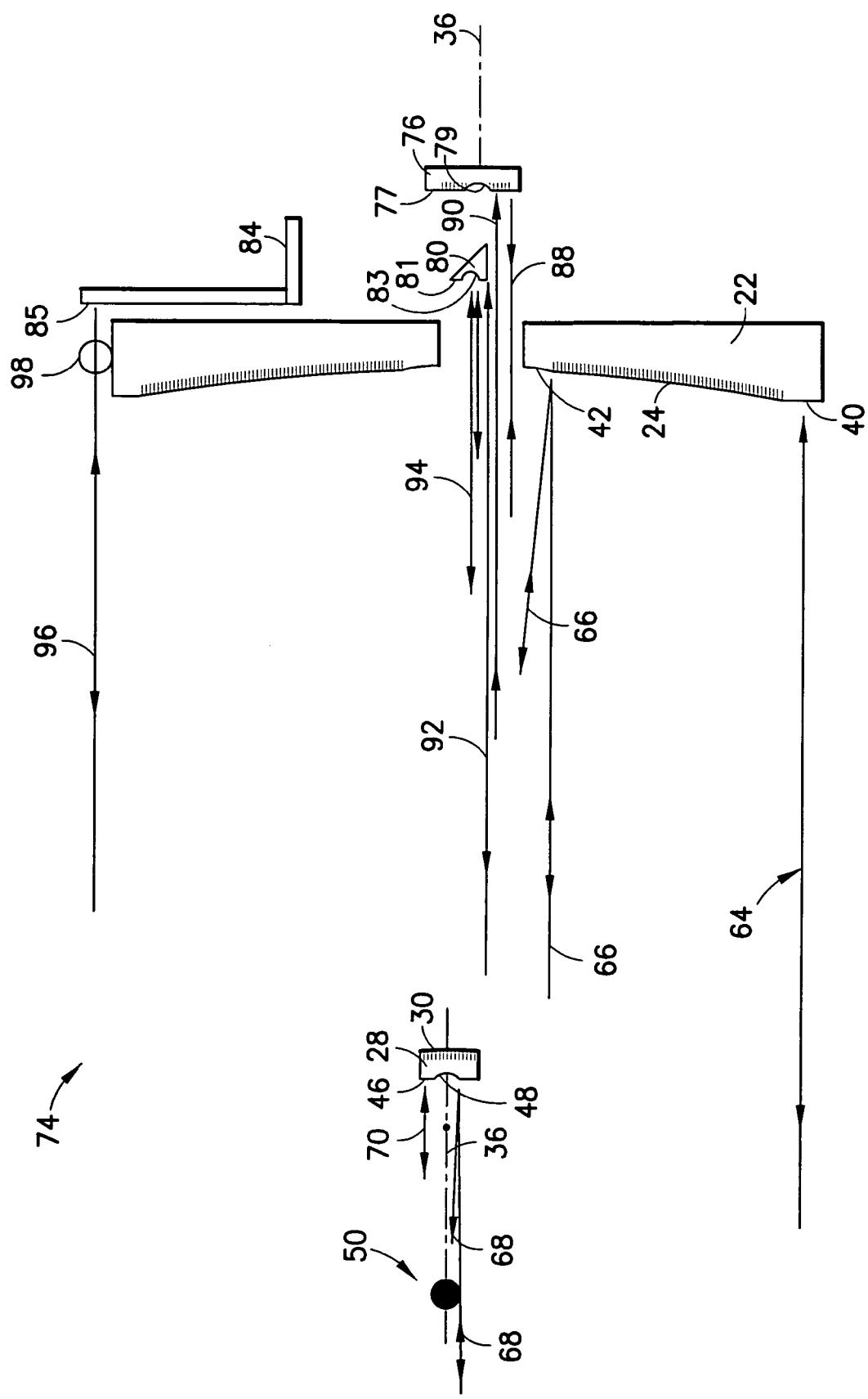
FIG. 5B is a schematic view similar to FIG. 5A showing alignment beams.

FIGS. 5A–5B schematically show a standard 3-mirror astigmat telescope 74 incorporating the present invention. Except for optical characteristics of the active surfaces 24, 30, the primary reflector 22 and secondary reflector 28 are substantially similar to those discussed above for the 2-mirror telescope 20 and are aligned such that their optical axes 36 are coincident. The 3-mirror astigmat 74 further includes a tertiary reflector 76 defining an active concave surface 78, a folding flat 80 defining an active planar surface 82, and an off-axis target 84 defining an image plane 86 that is typically planar. To enable the image plane 86 to lie off the optical axis 36 defined by the active surfaces 24, 30 of the primary 22 and secondary 28 reflectors, respectively, the active planar surface 82 is inclined relative to the optical axis 36, but not perpendicular thereto. This enables a more compact design that has been widely employed in space-based telescopes. Since space-based telescopes are required to be re-aligned frequently due to material deformations arising from extreme temperature fluctuations that cause the active surfaces 24, 30, 78, 82 to change their optical characteristics, the present invention is particularly advantageous in such space-based telescopes.

FIG. 5A depicts normal operation of a standard off-axis 3-mirror astigmat. Incident light parallel to the optical axis 36 strikes the concave active surface 24 of the primary reflector 22 and is reflected to strike the active surface 30 of the secondary mirror 28 as previously described. Instead of striking a target at or near the focal point 87 defined by the active surface 30 of the secondary reflector 28, the reflected radiation crosses as that point 87 and passed to either side of the folding flat 80 to strike outboard portions of the active surface 78 of the tertiary reflector 76. Since a central portion of the active surface 78 of the tertiary reflector 76 is not optically active in normal operation, the 3-mirror astigmat 74 defines a second null zone 89 in the shadow of the folding flat 80 similar to that described above with reference to the primary reflector 22 and the secondary reflector 28. From the active surface 78 of the tertiary reflector 76, radiation is reflected back to the active planar surface 82 of the folding flat 82 and reflected onto the image plane 86 of the off-axis target 84. Typically, only the outboard portions of the image plane 86 are optically active in normal operation.

FIG. 5B depicts the 3-mirror astigmat 74 using alignment beams and alignment surfaces to align the various reflectors. A first alignment beam 64 incident on the first planar alignment surface 40 of the primary reflector 22 is reflected back 180° to align the primary reflector 22 in the x-y plane such that the first planar alignment surface 40 is perpendicular to the optical axis 36 defined by the active concave surface 24 of the primary reflector 22, similar to that described above. In this embodiment, it may be advantageous to dispose the first planar alignment surface 40, and potentially even the first concave alignment surface 42, outboard of the active concave surface 24 of the primary reflector 22 in order to preclude excessive interference with the optical pathways used during normal operation as described in FIG. 5A. The retro-reflector 50 is positioned and adjusted so that a second alignment beam 66, reflected from the first concave alignment surface 42 thereof, reflects to the retro-reflector 50, back to the first concave active surface 42, and away from the primary reflector 22 along a path parallel to the optical axis 36, similar to that described above.

Similar to the primary reflector 22, the tertiary reflector 76 defines a third planar alignment surface 77 and a third concave alignment surface 79 that may be centrally disposed or outboard of the active concave surface 78 of the tertiary reflector 76. A fifth alignment beam 88 incident upon the third planar alignment surface 77 is used to align the tertiary reflector 76 in tip and tilt, so that the optical axis defined by the active concave surface 78 of the tertiary reflector 76 is coincident with that defined by the active concave surface 24 of the primary reflector 22. The tertiary reflector 76 is then adjusted relative to the primary reflector 22 by means of (and relative to) the retro-reflector 50 so that a sixth alignment beam 90, incident upon and reflected from the third concave surface 79 of the tertiary reflector 76, is reflected onto the retro-reflector 50 to return to the third concave alignment surface 79 and depart from the tertiary reflector along a path parallel to the optical axis 36.

Preferably, the folding flat 80 is positioned next. The folding flat 80 is positioned in tip and tilt such that a seventh alignment beam 92 incident upon the fourth planar alignment surface 81 thereof is reflected back along a path parallel to the optical axis 36. Whether or not the active surface 82 of the folding flat 80 is planar, the folding flat 80 may also define a fourth concave alignment surface 83 that is used to position it relative to the primary reflector 22 and retro-reflector 50 along the optical axis 36. This is done using an eighth alignment beam 94 that is reflected from the fourth concave alignment surface 83 to the retro-reflector 50, back to the fourth concave alignment surface 83, and away from the folding flat 80 along a path parallel to the optical axis 36. The secondary reflector 28 may then be positioned as described above using the third 70 and fourth 68 alignment beams.

The off-axis target 84 may also be positioned by the teachings of this invention. The off-axis target 84 may define a fifth planar alignment surface 85, and a ninth alignment beam 96 may be reflected therefrom and the target 84 adjusted so that the ninth alignment beam 96 reflects from the fifth planar alignment surface along a path parallel to the optical axis. In the embodiment of FIG. 5B, the image plane 86 of the target 84 lies perpendicular to the optical axis 36, and a broad fifth planar alignment surface 85 does not enable alignment of the image plane relative to the optical axis 36, in which it is also sensitive. To avoid astigmatism on the image plane, the fifth planar alignment surface 85 may be made sufficiently narrow in its expanse along the x axis (vertical in FIG. 5B) so that only when the image plane 86 is positioned both parallel to the optical axis 36 and properly spaced therefrom will an alignment beam passing through a target aperture 98 be reflected back along a path parallel to the optical axis 36. These general teachings may also be applied to a target that is properly aligned in an orientation other than parallel to the optical axis 36 merely by properly orienting the fifth planar alignment surface 85 relative to the desired orientation of the image plane 86. Alternatively, a concave alignment surface (not shown) associated with the off-axis target 84 may be employed so that an alignment beam reflected from it passes to the retro-reflector 50 and back again, similar to the second 66 and fourth 68 alignment beams, to ensure proper positioning of the image plane 86 relative to the system optical axis 36.

In space based 3-mirror astigmats 74, it may be more advantageous to dispose the alignment surfaces of the present invention on some or all of the reflectors 22, 28, 76, the folding flat 80, and the off-axis target 84 facing opposite from that depicted in FIGS. 5A–5B. This is because physical compactness of space-based systems is desirable to enable initial deployment. Specifically, in reversing the orientation of the alignment surfaces from that of FIGS. 5A–5B, the first, third, fourth and fifth planar alignment surfaces 40, 77, 81 and 85 (respectively) would face to the right of the 3-mirror astigmat as illustrated in FIGS. 5A–5B, the second planar 46 and concave 48 alignment surfaces would face to the right, and the retro-reflector 50 would be positioned to the right of the tertiary reflector 76. In order not to excessively obstruct or interfere with the optical pathways that in normal operation (non-alignment) pass through a central portion of the primary reflector 22, it may be advantageous to align the various reflectors 22, 28, 76, and folding flat 80, in a sequential manner that precludes viewing alignment of all active surfaces simultaneously, as was described above with reference to the performance check beam 56 and the 2-mirror telescope 20. Such an approach depends upon how much of the normal optical path would be obstructed by any particular embodiment of the present invention.

Other astigmat telescopes may employ deformable and fast steering mirror assemblies, or a half-slivered folding mirror (as in a supernova acceleration probe or SNAP). The present invention may be employed to optically align some or all such mirrors, in certain instances by disposing alignment surfaces for an alignment beam from the front, from the rear, or from both ends of the telescope.

While there has been illustrated and described what is at present considered to be a preferred embodiment of the claimed invention, it will be appreciated that numerous changes and modifications are likely to occur to those skilled in the art. For example, the present invention includes using multiple retro-reflectors 50 disposed at various points along the optical axis 36 as drawn, even at the focal point 87 of FIG. 5A. It further includes aligning any or all of the various reflectors/mirrors either partially or completely (complete alignment being described herein), in any order. The order of reflector/mirror alignment may vary based on the specific location of an alignment surface (which may vary from embodiment to embodiment), obstruction of alignment beams by placement of other reflectors/mirrors, or other factors. Additionally, a concave or convex surface that physically defines only a portion of a parabola or a hyperbola defines an optical axis regardless of whether said surface is symmetric about the optical axis. The entire parabola or hyperbola defined mathematically by the physical portion thereof fully defines the optical axis. It is intended in the appended claims to cover all the above variations as well as those changes and modifications not explicitly noted that fall within the spirit and scope of the claimed invention.

What is claimed is:

1. In an apparatus having a first reflector defining an active concave surface and a second reflector defining an active surface facing the active concave surface, the active concave surface of the first reflector defining an optical axis, the improvement comprising at least one of:

defined by the first reflector, a first planar alignment surface that is perpendicular to the optical axis defined by the active concave surface and a first concave alignment surface defining an optical axis coincident with that defined by said active concave surface; and defined by the second reflector, a second planar alignment surface that is perpendicular to an optical axis defined by the active surface of the second reflector and a second concave alignment surface that defines an optical axis that is coincident with that defined by said active surface of said second reflector.

2. The apparatus of claim 1 wherein both the first reflector defines said first planar and first concave alignment surfaces, and the second reflector defines said second planar and said second concave alignment surfaces.

3. The apparatus of claim 2 wherein each of said first and second concave alignment surfaces face the same direction.

4. The apparatus of claim 2 wherein the first concave alignment surface defines a parabola.

5. The apparatus of claim 4 wherein the second reflector is disposed between a vertex and a focus defined by said parabola.

6. The apparatus of claim 5 wherein a focus defined by the second concave alignment surface is co-incident with the focus defined by the parabola of the first concave alignment surface when said first and second reflectors are aligned in five degrees of freedom.

7. The apparatus of claim 6 in combination with a retro-reflector for optically positioning the second reflector relative to the first reflector.

8. The apparatus of claim 1 wherein the first reflector defines a first planar and first concave alignment surfaces, wherein at least a portion of one of said alignment surfaces lie outboard of the active concave surface.

9. The apparatus of claim 1 wherein at least one of: a first body attached to said first reflector defines at least one of said first planar and first concave alignment surfaces; or a second body attached to said second reflector defines at least one of said second planar and second concave alignment surfaces.

10. The apparatus of claim 1 in combination with an interferometer disposed such that an alignment beam, perpendicular to at least one of said first or second planar alignment surfaces, is aligned to reflect from the at least of said first or second planar alignment surfaces.

11. The apparatus of claim 1 in combination with an interferometer positioned such that a performance check beam reflected from, in order, the active concave surface of the primary reflector, the active surface of the secondary reflector, at least one other reflector, the active surface of the secondary reflector, and the active concave surface of the primary reflector, is interfered with a reference beam at a reference flat of the interferometer.

12. The apparatus of claim 11 wherein the performance check beam may be used to simultaneously measure alignment at least in five degrees of freedom among the first and second reflectors.

13. In the apparatus of claim 1 further comprising a tertiary reflector defining an active tertiary concave surface, the improvement comprising at least one of:

defined by the first reflector, a first planar alignment surface that is perpendicular to an optical axis defined by the concave active surface and a first concave alignment surface defining an optical axis coincident with that defined by said active concave surface;

defined by the second reflector, a second planar alignment surface that is perpendicular to an optical axis defined by the active surface of the second reflector and a second concave alignment surface that defines an optical axis that is coincident with that defined by said active surface of said second reflector; or defined by the tertiary reflector, a third planar alignment surface that is perpendicular to the optical axis defined by at least one of the active surface of the first and second reflectors, and a third concave alignment surface that defines an optical axis that is coincident with that defined by at least one of the active surface of the first and second reflectors.

14. The apparatus of claim 1 wherein the apparatus is a telescope.

15. A method for aligning a first and a second reflector with one another comprising:

adjusting tip and tilt of a first reflector so that a first planar alignment surface defined by the first reflector is perpendicular to an optical axis and to a first alignment beam;

positioning a retro-reflector along the optical axis;

adjusting the retro-reflector along the optical axis relative to the first reflector;

disposing a second reflector spaced from the first reflector such that an active surface of the second reflector faces an active surface of the first reflector;

adjusting tip and tilt of a second reflector so that a second planar alignment surface of the second reflector is perpendicular to the optical axis;

adjusting one of the first and second reflectors relative to the other of the first and second reflectors such that their optical axes are coincident and the reflectors are spaced from one another.

16. The method of claim 15 wherein adjusting the retro-reflector along the optical axis relative to the first reflector comprises positioning the retro-reflector coincident with a focus defined by a first concave alignment surface defined by the first reflector.

17. The method of claim 15 wherein adjusting one of the first and second reflectors comprises positioning the second reflector such that a focus defined by a second concave alignment surface defined by the second reflector is co-located with said retro-reflector.

18. The method of claim 15 further comprising providing a performance check beam to impact, in order, the active surface of the first reflector, the active surface of the second reflector, at least one additional reflective surface, the active surface of the second reflector, and the concave surface of the first reflector.

19. The method of claim 15 wherein an interferometer is used for at least one of: adjusting tip and tilt of the first reflector, adjusting the retro-reflector, adjusting tip and tilt of the second reflector, or adjusting at least one of the first and second reflectors relative to the other.

20. A method of displaying alignment of a first reflector relative to a second reflector in five degrees of freedom simultaneously, comprising:

providing a performance check beam parallel to an optical axis defined by a first and second reflector;

reflecting the performance check beam from, in order, a first point on an active concave surface defined by the first reflector, a second point on an active surface of the second reflector that faces the concave surface, at least a third point on an additional reflective surface, a fourth point on the active surface of the second reflector, and a fifth point on the active concave surface;

interfering a beam reflected from the fifth point with a reference beam to display relative alignment of the reflectors.

* * * * *